(12) United States Patent
Artieres et al.

(10) Patent No.: US 8,316,694 B2
(45) Date of Patent: Nov. 27, 2012

(54) DEVICE, SYSTEM, AND METHOD FOR DETECTING AND LOCATING MALFUNCTIONS IN A HYDRAULIC STRUCTURE, AND A HYDRAULIC STRUCTURE WITH SAID DEVICE

(75) Inventors: Olivier Artieres, Mezieres sur Seine (FR); Cyril Guidoux, Grenoble (FR); Jean-Jacques Fry, Bassens (FR); Jean-Marie Henault, Magny les Hameaux (FR); Sylvain Blairon, Le Pecq (FR); Gauthier Vercoutere, Toulouse (FR); Marc Voet, Rocles (FR); Johan Vlekken, Diepenbeek (BE); Yves-Henri Faure, Meylan (FR); Paul Royet, Le Tholonet (FR); Alain Bernard, Meyreuil (FR); Fabrice Daly, L'Hay les Roses (FR)

(73) Assignees: Tengate Geosynthetics France, Bezons (FR); Electricite de France, Paris (FR); Fiber Optics Sensors & Sensing Systems BVBA, Geel (BE); Universite Joseph Fourier, Saint Martin d'heres (FR)

( * ) Notice: Subject to any disclaimer, the term of this patent is extended or adjusted under 35 U.S.C. 154(b) by 616 days.

(21) Appl. No.: 12/309,130

(22) PCT Filed: Jul. 12, 2007

(86) PCT No.: PCT/FR2007/051645
§ 371 (c)(1),
(2), (4) Date: Nov. 19, 2009

(87) PCT Pub. No.: WO2008/007025
PCT Pub. Date: Jan. 17, 2008

(65) Prior Publication Data
US 2010/0175460 A1    Jul. 15, 2010

(30) Foreign Application Priority Data

Jul. 13, 2006 (FR) .................................. 06 52958

(51) Int. Cl.
*G01M 3/04* (2006.01)
(52) U.S. Cl. ............................................................ 73/40
(58) Field of Classification Search .......... 73/40; 374/4, 374/100; 356/32, 256
See application file for complete search history.

(56) References Cited

U.S. PATENT DOCUMENTS 5,399,854 A   3/1995   Dunphy et al. .......... 250/227.17
(Continued)

FOREIGN PATENT DOCUMENTS

DE    196 21 797 A1   12/1997
(Continued)

*Primary Examiner* — Peter Macchiarolo
*Assistant Examiner* — Tamiko Bellamy
(74) *Attorney, Agent, or Firm* — Hamre, Schumann, Mueller & Larson, P.C.

(57) ABSTRACT

The invention relates to a device (10) for detecting and locating fluid leakage from a hydraulic work, the device being characterized in that it comprises a geotextile fabric (12) made of yarns or fibers and provided with:
    at least one first optical cable (14) in contact with said geotextile (12) and formed by a protective tube within which at least one multimode optical fiber (141) is placed, said multimode optical fiber (141) being suitable for detecting a temperature variation and transmitting a signal that is modified when temperature varies and
    at least one second optical cable formed by a sheath receiving tightly at least one monomode optical fiber (142) suitable for detecting a deformation of the geotextile (12) and for transmitting a signal that is modified when the deformation is detected in that said second optical cable being bonded to the geotextile (12). The invention is applicable to detecting and locating leakage from hydraulic works.

24 Claims, 3 Drawing Sheets

U.S. PATENT DOCUMENTS

| | | | |
|---|---|---|---|
| 5,567,932 A | 10/1996 | Staller et al. | 250/227.14 |
| 5,663,490 A | 9/1997 | Kozen | 73/49.2 |
| 6,004,639 A | 12/1999 | Quigley et al. | 428/36.3 |
| 6,097,862 A * | 8/2000 | Abramov et al. | 385/37 |
| 6,305,427 B1 | 10/2001 | Priest, II | 138/125 |
| 2003/0127587 A1 | 7/2003 | Udd et al. | 250/227.14 |
| 2004/0154380 A1 | 8/2004 | Walker | 73/40.5 R |
| 2007/0065071 A1 | 3/2007 | Slade et al. | 385/12 |
| 2008/0084914 A1* | 4/2008 | Yamamoto et al. | 374/137 |
| 2009/0303460 A1* | 12/2009 | Habel et al. | 356/32 |

FOREIGN PATENT DOCUMENTS

| | | |
|---|---|---|
| EP | 1 235 089 A1 | 8/2002 |
| JP | 62-203083 A | 9/1987 |
| JP | 5-107121 A | 4/1993 |
| JP | 7-092054 A | 4/1995 |
| JP | 11142281 A * | 5/1999 |
| JP | 2001-296151 A | 10/2001 |
| WO | WO 2006/064284 A1 | 6/2006 |
| WO | WO 2007/131794 A2 | 11/2007 |

* cited by examiner

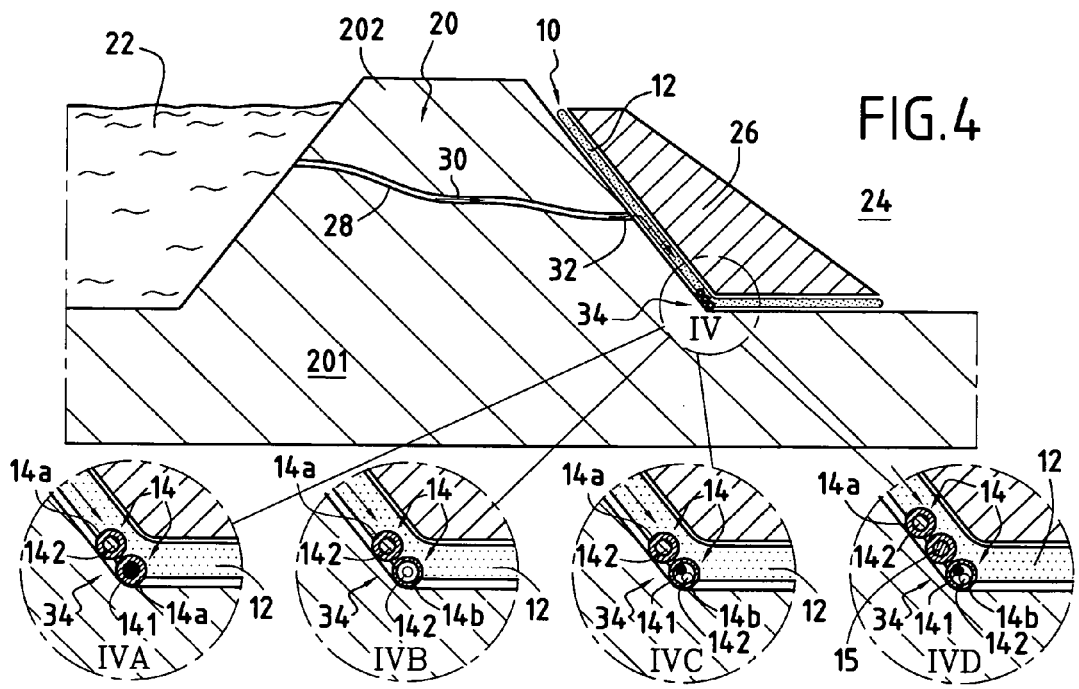
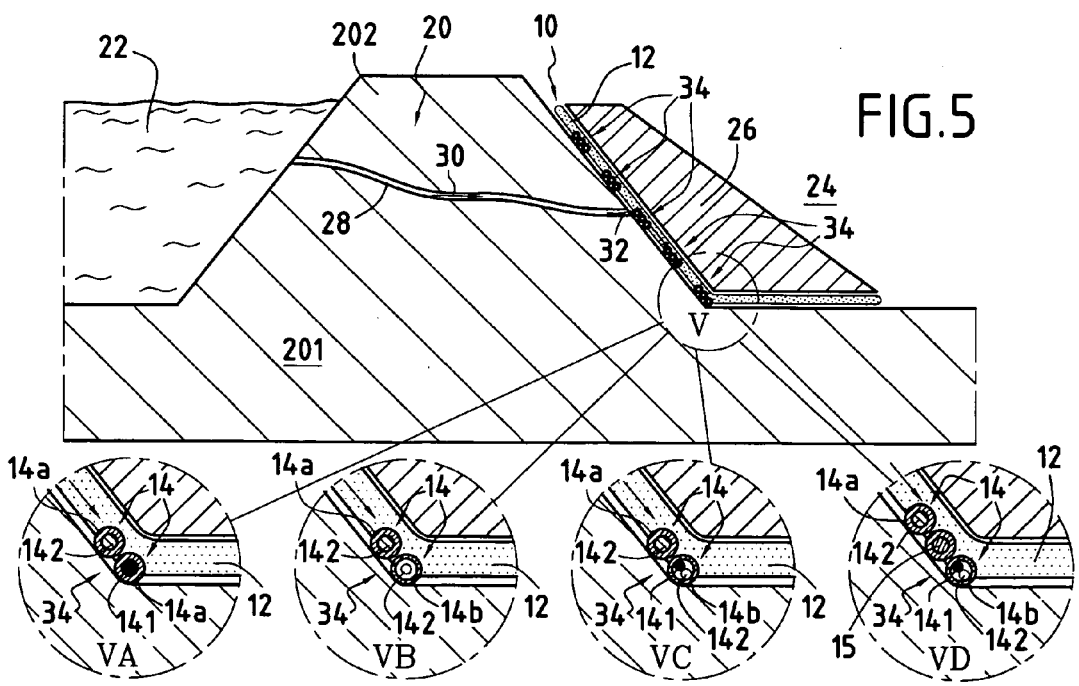

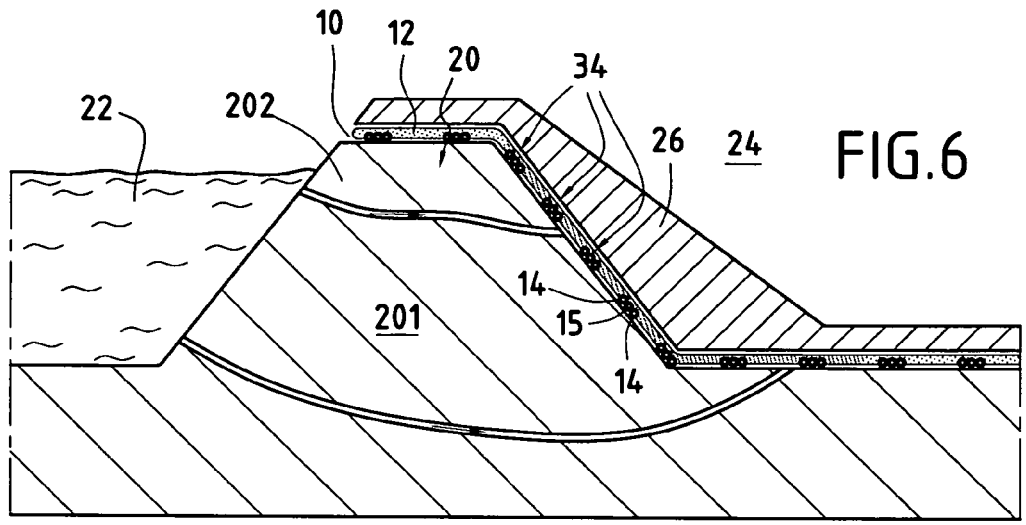
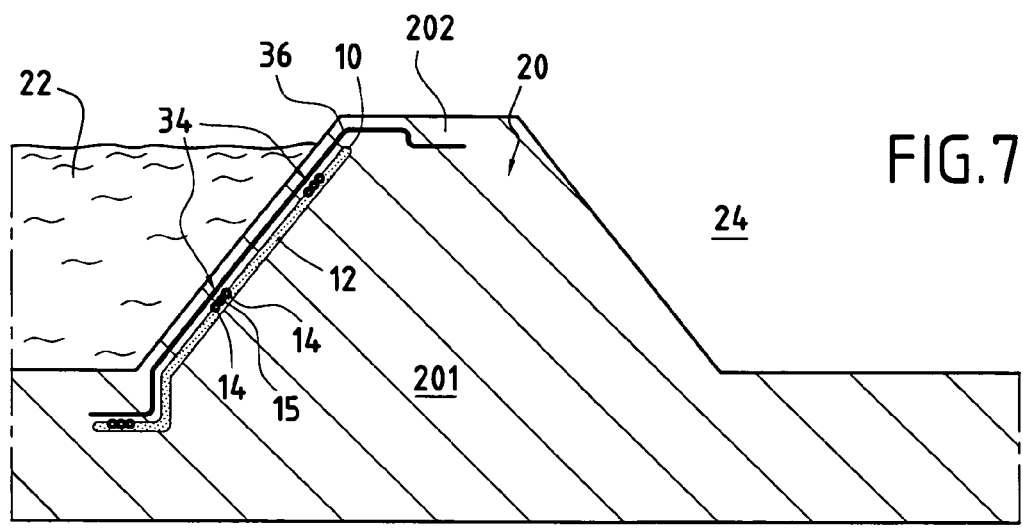

DEVICE, SYSTEM, AND METHOD FOR DETECTING AND LOCATING MALFUNCTIONS IN A HYDRAULIC STRUCTURE, AND A HYDRAULIC STRUCTURE WITH SAID DEVICE

The invention relates to a device, a system, and a method for detecting and locating malfunction in a hydraulic work, and also to a hydraulic work fitted with the device.

The term malfunction is used to mean in particular an abnormal leakage of fluid, and also any deformation or settling of the hydraulic work.

The terms work or hydraulic work are used to mean civil engineering works such as dikes for canals, reservoirs, or rivers, or dikes or levees for providing protection against flooding, and dams and also watertight storage works such as reservoirs, dikes and dams, dumps, or even other leaktight devices (e.g. pipelines, including gas pipelines).

In all such works, there is a proven risk of leakage of the fluid, in particular water, contained by the work.

Such leaks may stem from numerous different causes, amongst which mention can be made of overflow due to flooding, runoff, which may be combined with damage to the strength and/or the cohesion of the work, after a period of drought, ground movement, non-uniform ground, aging of the work, new localized stresses, holes made by the roots of plants, animal burrows, flow paths created by erosion or by soil being entrained or a defect or damage to the sealing structure.

Usually, in order to detect and locate leakage in a dike, an optical cable is used that is laid longitudinally in the dike at the foot of the dike and that enables temperature to be measured. Thus, by means of a variation in temperature, it is possible to detect the presence of leakage water reaching the optical fiber. This is disclosed, for example, in the publication by S. Johansson (1997) (Seepage monitoring in embankment dams, doctoral thesis, Royal Institute of Technology, Stockholm, Sweden, 50 p.) or in patents DE 19 506 180 and DE 10 052 922.

Under such circumstances, information relating to the occurrence of a leak in the work may arrive relatively late, particularly when the leak has begun at a location in the dike that is situated high up and is remote from the position of the optical fiber. In addition, since temperature measurement is modified by non-uniformity in the soil surrounding the optical fiber, a large amount of uncertainty remains concerning the variation threshold that should be considered as being representative of the presence of a leak.

Document EP 0 978 715 discloses using optical fibers contained in cables for monitoring the state of tubes or the like conveying gaseous or liquid fluids under pressure.

Under such circumstances, the cables need to be placed inside the tubes to be monitored.

Lastly, according to another technique designated as "active" combines a heated electric wire with a temperature measuring optical fiber, i.e. the temperature in the vicinity of the optical fiber is raised and the variation in the temperature over time is measured, with this variation being faster with increasing fluid flow rate (see the publication by S. Perzlmaier et al. (2004): Distributed fiber optic temperature measurements in hydraulic engineering—Prospects of the Heat-up Method, ICOLD Annual Meeting, Seoul 2004, or patent DE 10 052 922).

An object of the present invention is to provide a device and a method enabling the drawbacks of the prior art to be overcome, and in particular making it possible to detect more quickly a leak from a work, in particular a hydraulic work.

To this end, according to the present invention, the device for detecting and locating leakage is characterized by the fact that it comprises a geotextile provided with at least one optical cable comprising at least an optical fiber suitable for detecting a temperature variation and for transmitting a signal that is modified when a variation of the temperature is detected, said optical cable being in contact with said geotextile.

In this manner, it can be understood that by providing contact between the optical fiber (or more generally its support, the assembly thereof forming an optical cable, said optical cable being able to contain several electric or optical fibers) and the geotextile, information is transferred to the optical fiber via the geotextile from any zone of the geotextile that is subjected to a leak. Since the geotextile is permeable, liquid progresses therethrough, so the slightest leak of water that reaches the geotextile is conveyed uniformly to the optical fiber, where the detected variation in temperature triggers a warning signal.

This solution presents the advantage of not restricting the zone being monitored to the zone that corresponds solely to the position of the optical fiber, i.e. it enables a much larger area to be monitored by the geotextile because of the leak draining and collecting phenomenon that takes place via the geotextile towards the fiber.

This means that the "a priori" location selected for the optical cable in the work is less constraining for all the measured characteristics. It means that it is possible to avoid having recourse to using a large number of optical fibers or cables for the purpose of covering the entire sensitive zone of the work (by using a relatively tight mesh), thus making it possible to achieve savings.

Mention can also be made of the protective function of the geotextile with respect to the optical fiber or cable with which it is in contact, thus making it possible to avoid having recourse to thick sheathed cables, which have the effect of increasing measurement response time.

Likewise, the presence of the geotextile forms a wall that slows down progress of the leak through the geotextile, even if it is permeable. The geotextile slows down the phenomenon of regressive erosion: it acts locally to plug a leak with particles of soil in suspension, thereby limiting flow speeds and thus the extent to which the walls along the leak are scoured.

This slowing down of the leakage and erosion phenomenon is most advantageous, since in combination with the increased speed of detection and localization, it makes it possible to save time and take action at a stage that is sufficiently early to avoid endangering the integrity of the work.

This is particular important with dry dikes so that action can be taken quickly and the necessary repairs carried out before the dike breaks.

Overall, by means of the solution of the present invention, it is possible to facilitate implementation both while installation is taking place and during utilization of the device for detecting and locating leakage, with the occurrence of a leak in a civil engineering work being detected more quickly and with greater sensitivity.

This contact between the optical fiber (cable) and the geotextile can be obtained in various ways from merely laying the optical fiber (cable) on or against the geotextile, to forming a mechanical connection or fastening between the optical fiber (cable) and the geotextile.

Actually, the optical cable is preferably bonded to said geotextile by bonding means, notably by at least one bonding component. Among possible bonding components, provision can be made for ligating yarn, securing yarn, warp or weft yarn when the geotextile is woven, glue, a hook like fastener, a hook and loop tape or fibers of each of two geotextiles bonded to each other by needlepunching, in which each of these bonding components can be used by its own or in combination with another type of bonding component.

Thus, when such a connection, in particular a mechanical connection, exists between the optical fiber (cable) and the geotextile, this solution also presents the additional advantage of making laying very easy since the geotextile is in the form of at least one sheet in which the optical fiber (cable)(s) is/are already secured at the desired location(s) depending on the type and the shape of the work, and also depending on the zones that it is estimated are sensitive to the risk of leakage.

In the present description, the term geotextile is used broadly, i.e. it covers a geotextile or a sheet similar to a geotextile in the meaning of international standard ISO 10318 including a non-woven geotextile, a composite drainage geotextile, a woven geotextile, or a geotextile of the grid type or of the knitted type.

Advantageously, said geotextile is provided with at least one another optical fiber suitable for detecting a deformation of the geotextile close to the optical fiber and for transmitting a signal that is modified when the deformation of the geotextile is detected.

In this way, by simultaneously detecting variation in temperature and deformation or movement of the geotextile, by virtue of the optical fiber being deformed, it is possible to assess better the phenomena that are occurring.

Under such circumstances, the contact, and in particular the connection, between the optical fiber (cable) and the geotextile enables deformations of the work to be measured by transferring movements of the ground to the optical fiber (cable) via the geotextile.

Likewise, under such circumstances, because of the good contact properties between the geotextile and its environment, and in particular the ground, the deformations or movements of the ground are transmitted by friction to the geotextile, which transmits them in turn to the optical fiber (cable) where the light signal is modified accordingly, thus enabling any deformation or movement phenomenon to be detected over a zone that is much larger than when using an optical fiber (cable) on its own without the geotextile.

In addition, the simultaneous detection of temperature variation and deformation in the work provides additional information, since the measured signals may correspond to circumstances that have already been observed and recorded in works of the same type, thus making it possible to obtain information about the nature and the cause of the leak.

In another advantageous disposition, said geotextile is provided with at least one another optical fiber suitable for detecting a variation of degree of moisture in the vicinity of the optical fiber and for transmitting a signal that is modified when the variation of the degree of moisture is detected.

In this way, by simultaneously detecting variation in temperature and in moisture content, it is possible to obtain a better diagnosis of the leakage phenomenon.

Preferably, relative moisture around the optical fiber (cable) is measured but more generally the detection can concern the moisture content of the soil or of any medium surrounding the optical cable.

Preferably, the device of the invention has a plurality of optical fibers (cables) disposed substantially parallel to one another.

Thus, because of the presence of a plurality of optical fibers (cables) that are similar and that measure the same parameter, in particular temperature, but also deformation and/or humidity, it is possible to locate the position and the extent of the leak.

It is also possible to envisage circumstances in which a plurality of optical (cables) are situated close to one another so as to form a bundle of (cables), serving to measure different parameters, in particular temperature and/or deformation, and/or moisture content, so as to obtain several different types of information about a given location of the geotextile.

In a variant, said optical (cables) are grouped together in at least one bundle of optical (cables), said bundle being placed at a location of the geotextile that corresponds to a zone of the work that is sensitive to leakage.

In this way, by using a plurality of bundles of optical (cables), each bundle measuring a plurality of parameters, in particular temperature and deformation, it is possible to obtain a better diagnosis of the leakage phenomenon, and also more accurate localization thereof.

According to another preferred disposition, at least one of said optical fibers transmitting a signal associated with temperature is placed at a location of the geotextile that is in a zone situated close to the air.

Thus, the measurement of air temperature by said appropriately placed optical fiber is used so that said measurement can constitute a reference measurement for tracking temperature variations at other locations where the same measurement is performed.

Advantageously, the device of the invention further includes at least one longitudinal heating device (heater electric wire or tube transporting a heated fluid) placed parallel to and beside said optical fiber.

This disposition enables another measurement technique to be used.

In another preferred disposition, said optical cable is a monomode optical cable or a multimode optical cable.

In another advantageous disposition, said optical cable is connected directly or indirectly to said geotextile.

In a preferred embodiment, said optical cable or (other) optical fiber is connected to the geotextile by at least one bonding component (for example ligating yarn, cable, needlepunching, gluing, fastening, hook and loop tape). This ensures intimate contact between the optical cable and the geotextile so that the optical cable reflects the state (in particular temperature, deformation, and/or moisture) of the geotextile. This intimate contact by tight mechanical connection is particularly important for ensuring that the deformations of the work, to which deformations the geotextile is also subjected, are fully relayed to the optical fiber(s).

In another embodiment, the device of the invention comprises first and second geotextiles, and said optical cable or said optical fiber is inserted between the first and second geotextiles. Under such circumstances, in one possible implementation, said optical fiber is connected to the first and second geotextiles or to only one of them.

In another possible implementation, there is no "intimate connection" between the optical fiber and the geotextiles: for example the two geotextiles are assembled together by two mutually gripping strips that are parallel to the fibers so that the fibers can move to a limited extent within the space defined by the two strips.

Under such circumstances, an intimate connection is provided between each optical fiber and the two geotextiles by different techniques for connecting each optical fiber to the first and second geotextiles, these techniques possible being used separately or in combination. Thus, for example, the connection may be achieved by adhesive, needling, heat-sealing, using gripping strips, stapling, or stitching between the two geotextiles.

In another preferred disposition, the device of the invention includes at least one optical fiber placed freely inside a protective tube connected to the geotextile, so that it is not submitted to external strains.

Under such circumstances, when at least two optical fibers are used, it is preferable to use two optical fibers constituted respectively by a monomode fiber and by a multimode fiber, which fibers are advantageously placed close to each other. These two optical fibers of different kinds can be used for measuring different parameters, or else for measuring the same parameter but by using different measurement techniques. Under such circumstances, it is possible to perform the measurement using different types of appliance, e.g. appliances operating with detection techniques based on the Raman effect or on the Brillouin effect.

Thus, overall and in accordance with the invention, it is possible to select the type, the number, and the locations of the optical fibers in the geotextile(s) so as to adapt the type of detection (temperature only, temperature and deformation, temperature and moisture, or temperature and deformation and moisture), and also the location(s) being monitored, to the type of the work, to the site, and to the desired detection sensitivity, thus making it possible to provide a tailor-made detecting and locating solution in a product that is easy to install.

It is also possible to select the type of geotextile to match the level of protection desired for the optical fiber, or to satisfy the filtering conditions of the ground, or indeed to adapt its permeability or its draining properties.

In conventional manner, the optimum properties for geotextiles are calculated as a function of the characteristics of the work. For example, for a protective function, thick non-woven geotextiles are generally used. For a filter function, the filter opening and the permeability of the geotextile are calculated as a function of the characteristics of the soil to be filtered: nevertheless, it is known that with non-woven fabrics the number of filter constrictions should preferably lie in the range 25 to 40. For the function of slowing down erosion of fine material, it is desirable to have filter openings that are small enough to slow down the particles that are transported in suspension by the flow.

The invention also relates to a system for detecting and locating fluid leakage from a hydraulic work, the system comprising a device for detecting and locating leakage of the type described above and at least one measurement appliance connected to said optical fiber and serving to indicate any variation in the signal transmitted by the optical fiber.

In addition, the invention also relates to a hydraulic work fitted with such a device for detecting and locating leakage, in particular a hydraulic work formed by a dike (dry or in water), and in which said device for detecting and locating leakage is placed longitudinally in the body of the dike so as to cover the dike over part or practically all of its height.

Under such circumstances, said device for detecting and locating leakage is preferably placed in the body of the dike on its side remote from the water (downstream side).

Also preferably, said optical fiber, which is placed at a location in the geotextile that corresponds to a zone situated close to the air, is placed so as to be at the top of the work.

In addition, the present invention achieves the above-mentioned object by a method of detecting and locating leakage of a fluid from a hydraulic work, which method is characterized in that a variation in temperature is detected by means of a modification of the signal transmitted by an optical fiber comprised in an optical cable in contact with the geotextile, said optical cable being placed on or against the geotextile or being connected directly or indirectly to said geotextile.

Preferably, the method also makes it possible to detect:
deformation of the geotextile by means of a modification to the signal transmitted by an optical fiber connected directly or indirectly to said geotextile, notably by a ligating yarn; and/or
a variation in the moisture content of the geotextile by means of a modification in the signal transmitted by an optical fiber connected directly or indirectly to said geotextile, notably by a ligating yarn.

Other advantages and characteristics of the invention appear on reading the following description made by way of example and with reference to the accompanying drawings, in which:

FIGS. 3 to 7 are section views showing a plurality of possible uses of the device of the invention for a water-retaining dike.

Figure 1:
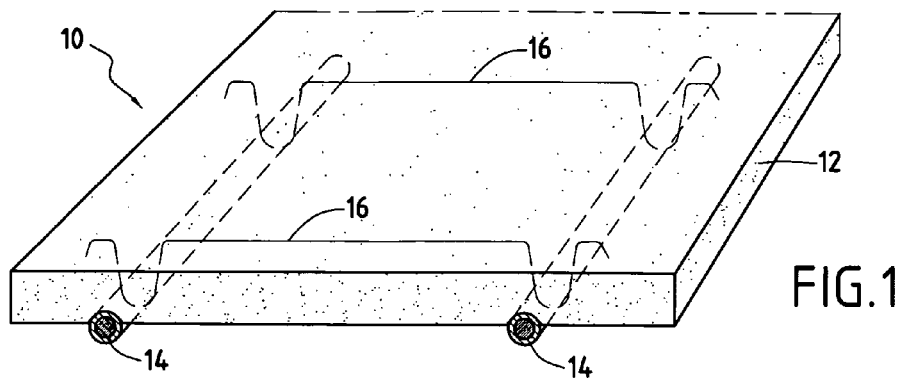
FIG. 1 is a partially transparent diagrammatic perspective view of an embodiment of the device of the present invention for detecting and locating leakage.

With reference to FIG. 1, the device 10 for detecting and locating leakage comprises a geotextile 12 having placed on its bottom surface a plurality of mutually parallel optical fibers (or cables) 14 which are intimately connected to the geotextile 12 by bonding means formed in this example by stitching or ligating yarns 16.

As an equivalent way, optical cables 14 can be directly integrated within a woven geotextile, notably by being used as a warp yarn in a weaving of straight warp construction. When the geotextile is woven, the weft yarns are considered as ligating (or bonding) components of the product.

According to another possibility, notably when a geotextile of a grid type is used, optical cables 14 are glued on the geotextile by means of the coating (for instance PVC) which has been generally spread over the yarns or small strips of the grid.

When a knitted grid type geotextile is used, which is composed of several warp and weft yarns or cables, the optical cables can also be bonded to the other yarns of the fabric by the ligating yarn forming itself a yarn of the fabric.

Figure 2:
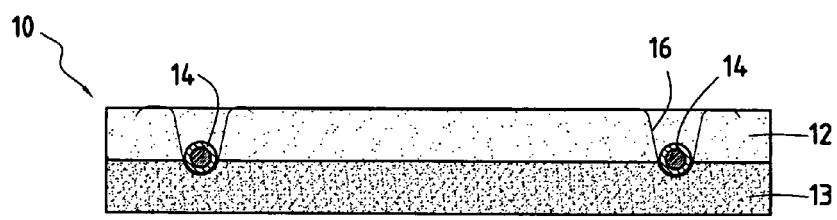
FIG. 2 is a cross-section view of another embodiment of the device for detecting and locating leakage.

In another embodiment shown in FIG. 2, the device for locating and detecting leakage comprises first and second geotextiles 12 and 13 having a plurality of mutually parallel optical fibers (or cables) 14 placed between them. The assembly is bonded together by connecting the two geotextiles 12 and 13 together by means that are again constituted by a stitching yarn 16 in the example shown.

Other means for assembling together the two geotextiles 12 and 13 could be provided, in particular means selected from the following:
adhesive;
stitching between the two geotextiles 12 and 13, in particular if the two geotextiles 12 and 13 are made as non-woven fabric;
heat-sealing as a result of melting the facing surfaces of the geotextiles 12 and 13;
using a plurality of pairs of automatically gripping strips, provided respectively with hooks and with projecting elements having projections at their free ends (of the "Velcro" (registered trademark) type) or a plurality of strips in which both faces are self-adhesive;
by stapling; or
by stitching.

Provision can also be made for connecting the optical cable 14 to only one among the two geotextiles 12 and 13, for instance, by means of a ligating yarn or of any other means for assembling such as those mentioned above. In this latter case, means for connecting the optical cable 14 to the geotextile 12 or 13 can be different from means assembling together the two geotextiles 12 and 13.

In any event, provision can be made for the connecting technique used between the two geotextiles 12 and 13 to be applied over the entire facing areas of the two geotextiles 12 and 13, or else in strips parallel to the fibers of the geotextiles.

In the description, the generic term "optical cable" is used to designate either a sheathed optical fiber, or a plurality of optical fibers received tightly in a sheath, or an optical fiber mounted freely in a tube, or a plurality of optical fibers received freely in a tube.

Figure 3:
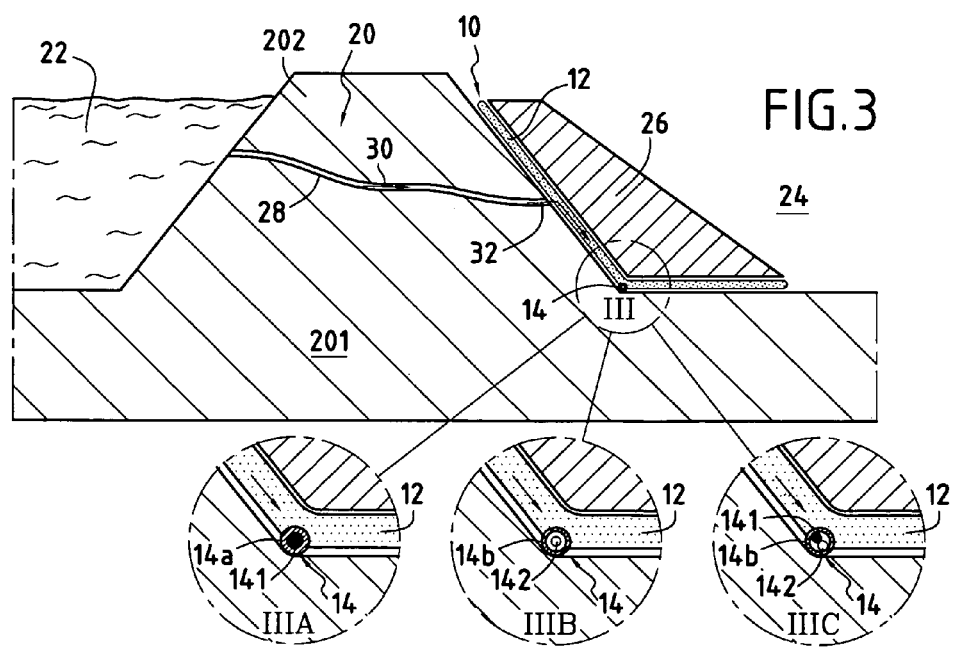

Reference is now made to FIG. 3 showing a first utilization of the device 10 for detecting and locating leakage that enables a temperature measurement to be taken by using an optical cable 14.

A (water) dike 20 separates an "upstream", first space full of water 22 (to the left of the figure) from a "downstream", second space 24 (to the right of the figure) which is to remain dry and to be protected from any overflow of the water 22.

The dike 20 extends vertically between a dike foot 201 and a top 202, and horizontally under each of the two spaces 22 and 24. In the space 24, in order to keep the device 10 firmly pressed against the downstream slope of the dike body 20 and under the space 24, ground weighting 26 has been put into place, e.g. made up of sand and/or gravel and/or rocks.

A device 10 for detecting and locating leakage is positioned so as to cover the slope of the dike 20 facing towards the space 24 (downstream slope) covering practically the entire height of the dike 20 and also a substantially horizontal portion extending under the ground weighting 26 towards the space 24, beyond the dike foot 201.

In this first example, the device 10 comprises a geotextile 12 connected to a single optical cable 14 which is situated at a location that is considered as being the most sensitive to leaks, i.e. at the dike foot 201, at the lowest point of the downstream slope of the body of the dike 20 facing the space 24, i.e. at a location where the geotextile forms a bend.

In FIG. 3, there is also shown, diagrammatically, the propagation of a leak (arrow 30) along a leakage channel 28 passing through the dike 20 between the spaces 22 and 24 at a medium height up the slope of the dike 20.

This channel 28, which has been excavated by water 22 flowing from the side wall of the dike 20 facing the space 22 (upstream slope), naturally slopes downwards a little from the space 22 going towards the space 24. In addition, this channel 28 will normally tend to become larger because of a regressive erosion phenomenon that takes place essentially beside the side wall of the dike 20 that faces towards the dry space 24 (downstream slope).

The geotextile 12 has a function of filtering the soil of the body of the dike 20 at the interface with the ground weighting 26. Nevertheless, in this example and in accordance with the present invention, the geotextile 12 at the outlet from the leakage channel 28 in the downstream slope of the dike 20 forms a barrier, not against water which flows along the leakage channel 28, since the geotextile is permeable, but against the particles of soil put into suspension in the leakage channel 28 by the flow of water: thus, the geotextile 12 forms a local plug in line with the leakage channel 28, thereby limiting the flow rate within the leakage channel 28 and thus the extent with which the walls along the leakage channel 28 are scoured, thereby slowing down expansion of the leak.

Furthermore, in addition to this role of plugging and slowing down regressive erosion, the geotextile 12 also serves to drain (arrow 32) the water that flows along the leakage channel 28 down to the optical cable 14, thereby serving to accelerate information about the presence of water in the device 10 reaching the fiber 14 that is positioned at a location situated at a height that is different (specifically further down) than the height at which the leakage channel 28 is situated.

Amongst the potential geotextiles 12 that can be selected, mention can be made of a single or multilayer non-woven geotextile, a woven geotextile, a knitted geotextile, a draining geocomposite including a geospacing draining core of any kind, or any combination of those structures, and in particular a composite geotextile made by associating a needled non-woven fabric with knitted reinforcing cables. The association of reinforcing cables parallel to the optical fibers is interesting for pulling the geotextile when it is manufactured or set up, for the (un)rolling up, which avoid any mechanical stress on the optical cables.

The bottom of FIG. 3 also shows a detail III on a larger scale corresponding to the location of the optical cable 14 in three variant embodiments.

In the first variant embodiment shown on the left (III A) at the bottom of FIG. 3, the optical cable 14 is a multimode type optical fiber 141 that presents a sheath 14a tightly surrounding the optical fiber 141. This type of optical cable 14 is generally used for performing temperature measurements using the Raman effect.

Under such circumstances, it will be understood that when the leak reaches the optical cable 14, a significant variation in temperature is detected, corresponding to the variation between the temperature of the dike 20 and the temperature of the water contained in the space 22, thus enabling a signal to be created suitable for warning about the presence of a leak through the dike 20.

Under such circumstances, it will be understood that this measurement needs to present fairly high precision in order to give an indication that a leak is present as soon as possible. In particular, it is estimated that it is necessary, in the most critical situations, to be able to measure a temperature difference of 0.1° C., thereby making it possible to make the measurement directly without having recourse to heating the zone in which the measurement is made.

In the second variant embodiment shown in the middle (III B) at the bottom of FIG. 3, the optical cable 14 is made up of a monomode optical fiber 142 freely surrounded by a protective tube 14b. This type of optical cable 14 is used for making temperature measurements by using the Brillouin effect.

With the third variant embodiment shown on the right (III C) at the bottom of FIG. 3, use is made of an optical cable 14 made up of two optical fibers 141 and 142, respectively of the multimode type of the monomode type, which fibers are received freely in a protective tube 14b.

The presence of two types of optical fiber 141 and 142 makes it possible to make temperature measurements by the Raman effect and/or by the Brillouin effect. Under such circumstances, depending on the available equipment connected to one or the other or both of the optical fibers 141 and 142, it is possible at any moment and without any need to have a different device 10, to make the measurement(s) considered to be the most suitable, technically and/or economically.

Clearly, under all circumstances, the two ends of the optical cable 14 are connected respectively to a light emitter and to a measurement appliance (not shown) enabling the light ray that reaches it to be interpreted as an indication concerning the temperature of the optical cable 14, i.e. of the device 10 at the dike foot 201.

Reference is now made to FIG. 4 which shows a second utilization of the device 10 for detecting and locating leakage, enabling both a temperature measurement and a deformation measurement to be performed simultaneously by means of a bundle 34 of optical cables comprising two, three, or more optical cables 14.

In the description below, the same reference signs are used as those used above with reference to FIG. 3 to designate elements that are the same, and only elements that differ from those of the first utilization shown in FIG. 3 are described further below.

The general arrangement of the second utilization is similar to that of the first utilization, with the only difference lying in the use not of a single optical cable 14, but of a bundle 34 of optical cables 14, which bundle is always located at the foot of said dike, at the bottom of the side wall of the dike that faces towards the space 24 (the downstream slope).

To this end, and as shown in four enlargements of the detail IV, several variant embodiments are possible.

In the first variant embodiment shown to the left that the bottom of FIG. 4, reference IV A, the bundle 34 is made up of two optical cables 14 placed side by side: a monomode type optical fiber 142 (to the left) placed tightly in a sheath 14*a*; and a multimode type optical fiber 141 (to the right) placed tightly in another sheath 14*a*.

Under such circumstances, the monomode type optical fiber 142 operates by the Brillouin effect and it serves to measure any deformations of the dike 20 via deformations of the geotextile 12, while the multimode optical fiber 141 operates by the Raman effect and serves to measure the temperature at this height level of the geotextile 12.

Under such circumstances, it will be understood that the possibility of obtaining these two types of information of different kinds, i.e. the temperature and the deformation, enable the phenomena that are taking place in the dike 20 to be better assessed in order to provide more in-depth monitoring.

In the second variant embodiment shown in the second position from the left at the bottom of FIG. 4, reference IV B, use is likewise made of a bundle 34 of two optical cables 14, this time constituted by a monomode optical fiber 142 (on the left) placed tightly in a sheath 14*a*, and a monomode type optical fiber 142 placed freely in a tube 14*b* (on the right).

In this example, the optical fiber 142 held tightly in the sheath 14*a* serves to measure deformation by the Brillouin effect, while the monomode optical fiber 142 placed freely in the tube 14*b* is used for measuring temperature by the Brillouin effect.

In the third variant embodiment shown in the third position at the bottom of FIG. 4, reference IV C, use is likewise made of a bundle 34 made up of two optical cables 14. These comprise firstly once more a monomode type optical fiber 142 (to the left) placed tightly in a sheath 14*a* (to measure deformation by the Brillouin effect), and secondly a tube 14*b* (on the right) that receives two optical fibers: a multimode type optical fiber 141 (on the left), and a monomode type optical fiber 142 (on the right), this second optical cable 14 serving to measure temperature as in the third variant III C of FIG. 3.

In the fourth variant embodiment shown in the fourth and last position, on the right at the bottom of FIG. 4, and referenced IV D, use is made of a bundle 34 made up of two optical cables 14 together with an additional wire 15:

on the left: a monomode type optical fiber 142 placed tightly in a sheath 14*a* (measuring deformation by the Brillouin effect);

in the middle: an electric heater wire 15 so that the temperature measurement performed by the right optical cable 14 is performed by the so-called "heat-up" method, previously cited; and on the right: a tube 14*b* receiving two optical fibers: a multimode type optical fiber 141 on the left and a monomode type optical fiber 142 on the right, the second optical cable 14 serving to measure temperature as in the third variant III C of FIG. 3.

In these four variants, it will be understood that the possibility of obtaining two different kinds of information (temperature and deformation) enables the phenomena that are taking place in the dike 20 to be accessed better so as to provide more in-depth monitoring.

The nature of the optical cable used for measuring deformation is not restricted to those mentioned above, and other types of optical cable can be used such as those making use of optical fibers with Bragg gratings, in particular as in document FR 2 844 874.

Reference is now made to FIG. 5 which shows a third utilization of the device 10 for detecting and locating leakage that enables a temperature measurement and a deformation measurement to be performed simultaneously, and at a plurality of locations in the geotextile 12, by using a plurality of bundles 34 of optical cables 14 disposed longitudinally at different locations in the geotextile, these different locations corresponding to different heights along the side walls of the dike 20 that faces towards the space 24 (downstream slope).

In the description below, the same reference signs as those used above designate the same elements, with only those elements that are different being described below.

The general arrangement of this third utilization is similar to that of the second utilization shown in FIG. 4, with the only difference lying in using not a single bundle 34 of optical cables 14, but a multiplicity (two, three, or more) of bundles 34 of optical cables 14, that are disposed not only at the foot of the dike 20, at the bottom of the side wall of the dike facing towards the space 24, but also along the side wall of the dike 20 facing towards the space 24.

To this end, as shown in the four detailed enlargements referenced V, several variant embodiments are possible for each of the bundles 34, and the bundles 34 may be identical or they may differ from one another.

More precisely, four variant embodiments are provided, referenced V A to V D at the bottom of FIG. 5, which are respectively identical to the four variant embodiments IV A to IV D as described above with reference to FIG. 4.

In this configuration, the presence of a multiplicity of bundles 34 makes it possible not only to measure both temperature and deformation at each of the locations of the bundles 34, but also for each of these measurements to be able to identify the corresponding location of the dike 20 (and also to reduce the length of the flow between the point of convergence between the geotextile 12 and the bundle 34, and thus reducing the time required for detection and localization).

With reference to FIG. 6, there follows a description of another variant embodiment in which the device 10 for detecting and locating leakage is placed not only over the side wall of the dike 20 facing towards the space 24 (downstream slope) and under the space 24, as in the preceding examples of FIGS. 3 to 5, but also along the top (crest) 202 of the dike 20, the ground weighting 26 then extending over the crest of the dike 20, over the device 10, and also downstream from the dike 20 (to the right in FIG. 6).

In the fourth utilization shown in FIG. 6, the geotextile 12 includes, all along the device 10, a multitude of bundles 34 of optical cables 14, thus making it possible to obtain indications concerning temperature and deformation measurements and possibly also moisture measurements for each of the locations of its bundles 34 along the top, on the dry side, and also downstream from the dike 20.

This variant embodiment is equally applicable to the second and third utilizations shown respectively in FIGS. 3 and 4.

This variant embodiment must also be understood as encompassing another utilization, i.e. the situation in which instead of placing a multitude of bundles 34 of optical cables all along the device 10 for detecting and locating leakage covering its entire extent as shown in FIG. 6, it is a multitude of individually separate optical cables 14 that are put into place, each serving to perform temperature measurement only, as described with reference to FIG. 3.

It should be observed that in the context of the present invention, it is also necessary to include another configuration (not shown) in which, starting from the embodiment shown in FIG. 3, a single cable 14 is placed for measuring temperature at different locations of the geotextile 12 along the height of the side wall of the dike 20 facing towards the space 24 (the downstream slope), in such a manner as to be able to identify the location of each of the temperature measurements.

Reference is now made to FIG. 7 which shows a fifth utilization of the device 10 for detecting and locating leakage, in which, this time, the device is not placed on the side wall of the dike 20 facing towards the space 24 (downstream slope), but instead along the side wall of the dike 20 facing towards the water-retaining space 22 (upstream slope).

For this purpose, a sealing structure of any kind, e.g. concrete with hydraulic or asphalt binder, clayey material, geocomposite clay liner, or a geomembrane 36 is placed between the device 10 for detecting and locating leakage and the side wall of the dike 20 facing towards the space 22, thereby protecting the device 10 for detecting and locating leakage from any penetration of water that is not due to the presence of a leak.

In this configuration, as shown in FIG. 7, the device 10 for detecting and locating leakage extends longitudinally along the side wall of the dike 20 facing towards the space 22 (upstream slope) and also over the foot 201 of the dike, a little below the space 22, with the geomembrane 33 extending well beyond the maximum height of the device 10 along the top (the crest) 202 of the dike 20, and also under the space 22.

Once more, several configurations are possible for the optical cable(s) 14 present in the geotextile 12 of the device 10 for detecting and locating leakage: a single temperature-measuring optical cable 14, a plurality of separate optical cables 14 measuring temperature at different locations, a single bundle of optical cables 14 measuring temperature and deformation, or else, as shown in FIG. 7, a plurality of bundles 34 of optical cables for measuring both temperature and deformation (and possibly also moisture) at different locations along the device 10 for detecting and locating leakage.

It should be observed that in the context of these second to sixth utilizations described respectively with reference to FIGS. 3 to 7, it is possible (in a configuration not shown) not only to measure temperature and possibly also deformation, but also to measure moisture by placing an additional filament for performing such measurement (see for example EP 1 235 089) in each of the bundles 34.

Furthermore, amongst other variants that are possible within the context of the present invention, it should be observed that it is possible to insert reinforcing fibers/cables (made of polymer such as polyester, polypropylene, aramid, kelvar, etc. . . . or of other materials providing a large stiffness module in traction) in the device 10 for detecting and locating leakage, in particular in or on the geotextile(s) 12 (and 13), extending parallel to the optical cables 14, in particular in order to make it possible while installing the device 10 for detecting and locating leakage on site, to be able to unroll the sheet and pull on it without damaging the optical cables 14.

The various parameters mentioned above (in particular temperature, a signal representative of deformation, and moisture) can be measured continuously or discontinuously at times t0, t1, t2, . . . in an independent or simultaneous manner.

Provision can also be made for the device for detecting and locating leakage to be constituted by strips or rolls that are laid parallel, either side by side, possibly with a small amount of mutual overlap, or else spaced apart from one another. When using spaced-apart strips, it is envisaged that they be in contact with a draining layer placed under them or over them, the draining layer possibly being made of granular material such as sand or gravel, or of a geotextile or similar sheet.

The invention claimed is:

1. A device for detecting and locating fluid leakage from a hydraulic work, the device comprising:
    a geotextile fabric made of yarns or fibers;
    at least one first optical cable in contact with said geotextile and formed by a protective tube within which at least one multimode optical fiber is freely placed, said multimode optical fiber being suitable for detecting a temperature variation difference of 0.1° C. and for transmitting a signal that is modified when a variation of the temperature is detected, wherein the at least one first optical cable is disposed at a surface of the geotextile; and
    at least one second optical cable formed by a sheath receiving tightly at least one monomode optical fiber suitable for detecting a deformation of the geotextile and for transmitting a signal that is modified when the deformation is detected, wherein said second optical cable is bonded to the geotextile.

2. The device according to claim 1, wherein said second optical cable is bonded to the geotextile by bonding means.

3. The device according to claim 2, wherein a second monomode optical fiber is further freely placed in said protective tube of the first optical cable.

4. The device according to claim 1, wherein said geotextile is further provided with at least one third optical cable equipped with another optical fiber suitable for detecting a variation of degree of moisture in the vicinity of the optical fiber and for transmitting a signal that is modified when the variation of the degree of moisture is detected.

5. The device according to claim 1, wherein said optical cables are placed substantially parallel to one another.

6. The device according to claim 5, wherein said optical cables are grouped together in at least one optical cable bundle, said bundle being placed at a location of the geotextile that corresponds to a zone of the work that is sensitive to leaks.

7. The device according to claim 1, wherein at least one of said optical fibers transmitting a signal associated with temperature is disposed at a location of the geotextile which is in a zone situated close to the air.

8. The device according to claim 1, further comprising at least one heater longitudinal element placed parallel with and beside said first optical cable.

9. The device according to claim 1, further comprising reinforcing cables parallel to the optical cables.

10. The device according to claim 1, wherein it comprises first and second geotextiles, and in that said first and second optical cables are inserted between the first and second geotextiles.

11. The device according to claim 10, wherein said second optical cable is bonded to at least one among the first and second geotextiles by bonding means.

12. The device according to claim 1, wherein said first optical cable is bonded to said geotextile by bonding means.

13. The device according to claim 2, wherein said bonding means comprise at least one bonding component selected from the group consisting of a ligating yarn, a securing yarn, a warp or weft yarn, glue, a hook like fastener, a hook and loop tape or fibers of each of two geotextiles bonded to each other by needlepunching.

14. A system for detecting and locating leakage of a fluid from a hydraulic work, wherein the system includes the device according to claim 1 and at least one measurement appliance connected to each optical fiber and serving to indicate any variation in the signal transmitted by the optical fiber.

15. The device according to claim 1, including a dry or wet dike, said device for detecting and locating leakage being placed longitudinally in the body of the dike so as to cover at least a portion of the height of the dike.

16. The device according to claim 15, wherein said device has at least one of said optical fibers transmitting a signal associated with temperature disposed at a location of the geotextile which is in a zone situated close to the air, said device having a top, and wherein said optical fiber that is placed at a location of the geotextile that is in a zone situated close to the air, is placed in such a manner as to be at the top of the device.

17. A method of detecting and locating leakage of a fluid from a hydraulic work, comprising:
   detecting a temperature variation difference of 0.1° C. modification in a signal emitted by a multimode optical fiber placed in a protective tube of a first optical cable disposed at a surface of a geotextile fabric made of yarns or fibers; and
   detecting a deformation of the geotextile by the modification in the signal emitted by one monomode optical fiber placed in a second optical cable that is bonded to said geotextile.

18. The method according to claim 17, further comprising:
   detecting a variation in the moisture content of the geotextile by a modification in the signal emitted by an optical fiber placed in a third optical cable that is bonded to said geotextile.

19. The method according to claim 17, wherein said second optical cable is bonded to the geotextile by bonding means.

20. The method according to claim 19, wherein said bonding means comprise at least one bonding component selected from the group consisting of a ligating yarn, a securing yarn, a warp or weft yarn, glue, a hook like fastener, a hook and loop tape or fibers of each of two geotextiles bonded to each other by needlepunching.

21. The method according to claim 17, wherein a plurality of optical cables are used that are disposed so as to be substantially parallel to one another.

22. The method according to claim 17, wherein said optical cables are grouped together in at least one optical cable bundle, said bundle being disposed at a location of the geotextile that corresponds to a zone of the work that is sensitive to leaks.

23. The device according to claim 11, wherein said bonding means comprise at least one bonding component selected from the group consisting of a ligating yarn, a securing yarn, a warp or weft yarn, glue, a hook like fastener, a hook and loop tape or fibers of each of two geotextiles bonded to each other by needlepunching.

24. The device according to claim 12, wherein said bonding means comprise at least one bonding component selected from the group consisting of a ligating yarn, a securing yarn, a warp or weft yarn, glue, a hook like fastener, a hook and loop tape or fibers of each of two geotextiles bonded to each other by needlepunching.

* * * * *